United States Patent
Izumi et al.

(10) Patent No.: US 12,110,414 B2
(45) Date of Patent: Oct. 8, 2024

(54) METHOD FOR SUPPRESSING CORROSION UNDER HEAT-INSULATING MATERIAL, AND PASTE FOR SUPPRESSING CORROSION UNDER HEAT-INSULATING MATERIAL

(71) Applicant: Resonac Corporation, Tokyo (JP)

(72) Inventors: Hiroyuki Izumi, Tokyo (JP); Tatsuya Makino, Tokyo (JP); Tomohiko Kotake, Tokyo (JP); Satoshi Takayasu, Tokyo (JP); Naoyoshi Sato, Tokyo (JP)

( * ) Notice: Subject to any disclaimer, the term of this patent is extended or adjusted under 35 U.S.C. 154(b) by 1030 days.

(21) Appl. No.: 17/047,391

(22) PCT Filed: Apr. 16, 2018

(86) PCT No.: PCT/JP2018/015704
§ 371 (c)(1),
(2) Date: Oct. 14, 2020

(87) PCT Pub. No.: WO2019/202635
PCT Pub. Date: Oct. 24, 2019

(65) Prior Publication Data
US 2021/0115266 A1    Apr. 22, 2021

(51) Int. Cl.
*C09D 5/08* (2006.01)
*C09D 7/20* (2018.01)
*C09D 7/40* (2018.01)
*C09D 7/62* (2018.01)
*C09D 133/04* (2006.01)
*C09D 183/04* (2006.01)

(52) U.S. Cl.
CPC ............ *C09D 5/084* (2013.01); *C09D 7/20* (2018.01); *C09D 7/62* (2018.01); *C09D 7/70* (2018.01); *C09D 133/04* (2013.01); *C09D 183/04* (2013.01)

(58) Field of Classification Search
None
See application file for complete search history.

(56) References Cited

U.S. PATENT DOCUMENTS 5,916,954 A * 6/1999 Bohn ............... B32B 25/02
524/495
2015/0240076 A1    8/2015 Eling et al.

FOREIGN PATENT DOCUMENTS

| CN | 102382554 | 3/2012 |
| CN | 105038445 | 11/2015 |
| CN | 106285502 | 1/2017 |
| CN | 106930492 | 7/2017 |

(Continued)

OTHER PUBLICATIONS

Full English-language translation of KR 2010-033396 A, published Mar. 29, 2010. (See related U.S. Appl. No. 16/652,871 for actual translation).*

(Continued)

*Primary Examiner* — Joseph D Anthony
(74) *Attorney, Agent, or Firm* — SOEI PATENT & LAW FIRM

(57) ABSTRACT

A method for suppressing corrosion under insulation includes a step of applying a paste containing aerogel particles and a liquid medium to a target surface to form a coating film. A paste for suppressing corrosion under insulation contains aerogel particles and a liquid medium.

12 Claims, 1 Drawing Sheet

(56) References Cited

FOREIGN PATENT DOCUMENTS

| | | |
|---|---|---|
| EP | 3124555 | 2/2017 |
| JP | H4-372677 | 12/1992 |
| JP | H7-138520 | 5/1995 |
| JP | H10-508049 | 8/1998 |
| JP | 2000-026609 | 1/2000 |
| JP | 2007-514810 | 6/2007 |
| JP | 2011-027168 | 2/2011 |
| JP | 2012-233110 | 11/2012 |
| JP | 2013-100406 | 5/2013 |
| JP | 5250900 | 7/2013 |
| JP | 2017-031386 | 2/2017 |
| KR | 101645973 | 8/2016 |
| KR | 101726095 | 4/2017 |

OTHER PUBLICATIONS

International Search Report dated Jul. 17, 2018 for PCT/JP2018/015704.
International Preliminary Report on Patentability with Written Opinion dated Oct. 29, 2020 for PCT/JP2018/015704.
Extended Search Report in corresponding European Application No. 18915090.7, dated Mar. 3, 2021.

* cited by examiner

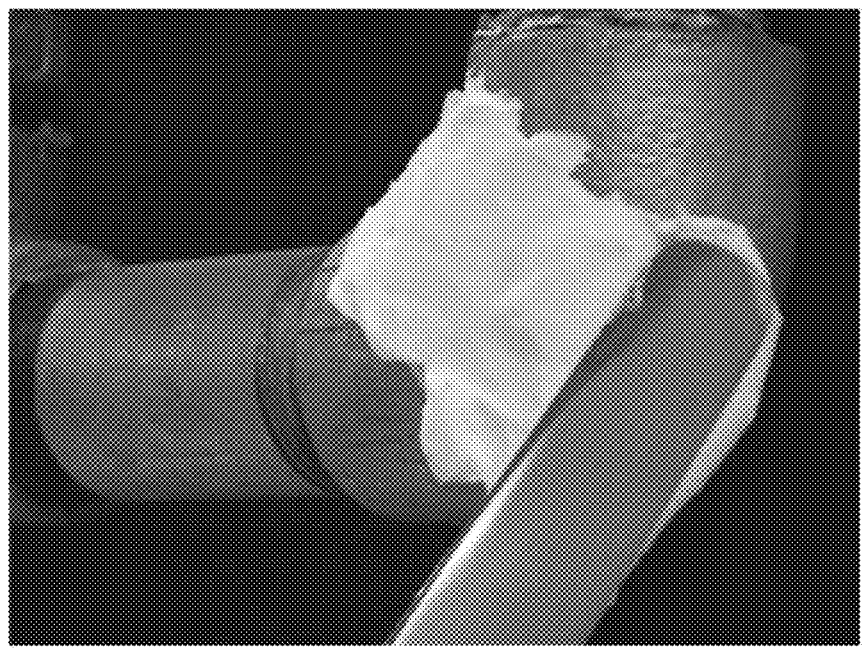

METHOD FOR SUPPRESSING CORROSION UNDER HEAT-INSULATING MATERIAL, AND PASTE FOR SUPPRESSING CORROSION UNDER HEAT-INSULATING MATERIAL

CROSS-REFERENCE TO RELATED APPLICATIONS

This application is a 35 U.S.C. § 371 national phase application of PCT/JP2018/015704, filed on Apr. 16, 2018.

TECHNICAL FIELD

The present invention relates to a method for suppressing corrosion under insulation and a paste for suppressing corrosion under insulation.

BACKGROUND ART

In various pipes in a large-scale facility such as a plant or a power plant, an insulation is provided in order to reduce heat energy loss. The insulation is generally a thermal insulation member having water permeability which is formed from an inorganic porous body or an inorganic fiber body. Therefore, in order to suppress the corrosion of the pipe, it has been studied that penetration of moisture into the insulation is suppressed by providing layers of a metallic sheathing material, a repairing material, and the like to the outside of the insulation (for example, Patent Literature 1).

CITATION LIST

Patent Literature

Patent Literature 1: Japanese Unexamined Patent Publication No. 2011-27168

SUMMARY OF INVENTION

Technical Problem

Incidentally, as also illustrated in each cross-sectional view of Patent Literature 1, in an embodiment essentially including an insulation, voids are generated between the pipe and the insulation to no small extent (at the periphery of reference numeral 21). In such voids, moisture originally existing in the insulation, moisture entering from a caulking portion such as a sheathing material, a flange part or the like of the pipe that is difficult to appropriately cover with a sheathing material or the like, and others are attached as condensation. The attached moisture causes corrosion of the pipe over the years, so-called corrosion under insulation (CUI).

The present invention has been made in light of the above-described circumstances, and an object thereof is to provide a method for suppressing such corrosion under insulation. Another object of the present invention is to provide a paste for suppressing corrosion under insulation to be used for the method.

Solution to Problem

The present invention provides a method for suppressing corrosion under insulation, comprising a step of applying a paste comprising aerogel particles and a liquid medium to a target surface to form a coating film. With such a method, the coating film formed from the paste can function as an insulation and can suppress a phenomenon that voids in which condensation occurs are generated between the coating film and the pipe. The corrosion under insulation is extremely difficult to cope with since the corrosion under insulation cannot be checked without removing a sheathing material or an insulation, but an underlying cause of corrosion under insulation can be excluded by the method of the present invention.

In the method of the present invention, a content of the aerogel particles can be set to 5% by mass or more based on the total amount of the paste.

The present invention also provides a paste for suppressing corrosion under insulation, comprising aerogel particles and a liquid medium. The paste can also be applied not only to a straight pipe part of the pipe but also to a place having a complicated shape such as a flange part or a bend part, without particular limitations. Therefore, corrosion under insulation over the entire pipe can be suppressed.

The paste of the present invention may comprise a binder resin. In particular, the binder resin may comprise a first binder resin and a second binder resin having a lower solubility to the liquid medium than the first binder resin. According to such a paste, a coating film superior in a coating film strength and adhesion can be obtained.

In the paste of the present invention, a content of the second binder resin may be greater than a content of the first binder resin. Thereby, a coating film superior in a coating film strength and adhesion is easily obtained.

In the paste of the present invention, the first binder resin may be a cellulose-based resin or an acrylic acid-based resin. Thereby, a coating film superior in a coating film strength and adhesion is obtained, and effects such that the viscosity of the paste is increased and a film is easily formed are achieved.

In the paste of the present invention, the second binder resin may be a thermoplastic resin. Thereby, a coating film further superior in adhesion is easily obtained. Furthermore, in the paste of the present invention, the second binder resin may be an acrylic resin.

In the paste of the present invention, the second binder resin may be a thermosetting resin. Thereby, a coating film further superior in a coating film strength is easily obtained. In the paste of the present invention, the second binder resin may also be a silicone resin.

The paste of the present invention may further comprise a fibrous substance. Thereby, a coating film further superior in a coating film strength is easily obtained.

In the paste of the present invention, the liquid medium may be a water-based solvent containing water. Thereby, the dispersibility of the aerogel particles is improved, and a uniform coating film is easily obtained.

Additionally, in the present invention, other porous particles may be used in addition to or instead of the aerogel particles. That is, the present invention can also provide a method for suppressing corrosion under insulation, comprising a step of applying a paste including porous particles and a liquid medium to a target surface to form a coating film, and a paste for suppressing corrosion under insulation, including porous particles and a liquid medium.

Advantageous Effects of Invention

According to the present invention, it is possible to provide a method for suppressing corrosion under insulation. The present invention can also provide a paste for suppressing corrosion under insulation to be used for the method.

BRIEF DESCRIPTION OF DRAWINGS

FIG. 1 is a view showing a method of applying a paste onto a target object by using a trowel.

DESCRIPTION OF EMBODIMENTS

Hereinafter, preferred embodiments of the present invention will be described in detail. However, the present invention is not limited to the following embodiments. In the present specification, the notation "to" expressing a numerical range indicates a range including the numerical values before and after "to", as the minimum value and the maximum value, respectively. When the phrase "A or B" is used, it is only required to include one of A and B, and both of A and B may be included. With respect to materials exemplified in the present embodiments, one material may be used singly, or two or more materials may be used in combination, unless otherwise stated.

<Aerogel>

In a narrow sense, dry gel obtained by using a supercritical drying method for wet gel is referred to as aerogel, dry gel obtained by drying under an atmospheric pressure is referred to as xerogel, and dry gel obtained by using freeze drying is referred to as cryogel; however, dry gel with a low density obtained by using any of these methods for drying wet gel is referred to as "aerogel" in the present embodiment. That is, in the present embodiment, the term "aerogel" means aerogel in a broad sense, namely, "Gel comprised of a microporous solid in which the dispersed phase is a gas". In general, the inside of an aerogel has a fine network structure, and has a cluster structure in which particulate aerogel components with a size of about 2 to 20 nm are bonded together. Among skeletons formed by this cluster, pores with a size less than 100 nm are present. Thereby, an aerogel has a three-dimensional fine porous structure. Further, the aerogel of the present embodiment is a silica aerogel, for example, having silica as a main component. Examples of the silica aerogel include a silica aerogel with an organic group (a methyl group or the like) or an organic chain introduced therein, the so-called organic-inorganic-hybridized silica aerogel.

The aerogel of the present embodiment includes aspects below. By employing any of these aspects, an aerogel superior in thermal insulation properties, flame retardant properties, heat resistance, and flexibility is easily obtained. By employing each aspect, an aerogel having thermal insulation properties, flame retardant properties, heat resistance, and flexibility corresponding to each aspect can be obtained.

First Aspect

The aerogel of the present embodiment can have a structure represented by General Formula (1) below. The aerogel of the present embodiment can have a structure represented by General Formula (1a) below as a structure including the structure represented by Formula (1).

[Chemical Formula 1]

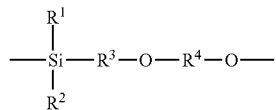

[Chemical Formula 2]

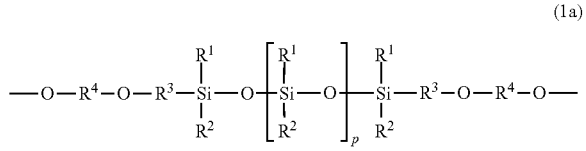

In Formula (1) and Formula (1a), $R^1$ and $R^2$ each independently represent an alkyl group or an aryl group, and $R^3$ and $R^4$ each independently represent an alkylene group. Here, examples of the aryl group include a phenyl group and a substituted phenyl group. Further, examples of the substituent of the substituted phenyl group include an alkyl group, a vinyl group, a mercapto group, an amino group, a nitro group, and a cyano group. "p" represents an integer of 1 to 50. In Formula (1a), two or more groups as $R^1$ may be identical or different, and, similarly, two or more groups as $R^2$ may be identical or different. In Formula (1a), two groups as $R^3$ may be identical or different, and, similarly, two groups as $R^4$ may be identical or different.

Through introduction of the structure represented by the above Formula (1) or Formula (1a), as the aerogel component, into the skeleton of the aerogel, the aerogel is provided with low thermal conductivity and becomes flexible. From such a viewpoint, $R^1$ and R in Formula (1) and Formula (1a) are, in one example, each independently an alkyl group having 1 to 6 carbon atoms, a phenyl group, and the like, and examples of this alkyl group include a methyl group. Furthermore, 3 and in Formula (1) and Formula (1a) are, in one example, each independently an alkylene group having 1 to 6 carbon atoms, and the like, and examples of this alkylene group include an ethylene group and a propylene group. In Formula (1a), "p" can be set to 2 to 30 and may be 5 to 20.

Second Aspect

The aerogel of the present embodiment has a ladder-type structure including struts and bridges, and the bridge can have a structure represented by General Formula (2) below. Through introduction of such a ladder-type structure, as the aerogel component, into the skeleton of the aerogel, heat resistance and mechanical strength can be improved. Further, the "ladder-type structure" in the present embodiment is a structure including two struts and bridges each connecting the struts (a structure having the form of a so-called "ladder"). In this aspect, the skeleton of the aerogel may consist of the ladder-type structure, and the aerogel may partially have the ladder-type structure.

[Chemical Formula 3]

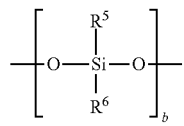

In Formula (2), $R^5$ and $R^6$ each independently represent an alkyl group or an aryl group, and "b" represents an integer of 1 to 50. Here, examples of the aryl group include a phenyl group and a substituted phenyl group. Furthermore, examples of the substituent of the substituted phenyl group include an alkyl group, a vinyl group, a mercapto group, an amino group, a nitro group, and a cyano group. Furthermore, in Formula (2), in a case where "b" is an integer of 2 or more, two or more groups as $R^5$ may be identical or different, and, similarly, two or more groups as $R^6$ may be identical or different.

Through introduction of the above structure, as the aerogel component, into the skeleton of the aerogel, for example, the aerogel is provided with flexibility superior to that of an aerogel having a structure derived from conventional ladder-type silsesquioxane (that is, having a structure represented by General Formula (X) below). Silsesquioxane is a polysiloxane having composition formula: $(RSiO_{1.5})_n$, and can have various skeleton structures such as those of cage-type, ladder-type, and random-type. Further, as represented by General Formula (X) below, the structure of a bridge in the aerogel having a structure derived from conventional ladder-type silsesquioxane is —O—, but the structure of a bridge in the aerogel of the present embodiment is the structure represented by the above General Formula (2) (polysiloxane structure). However, the aerogel of this aspect may have a structure derived from silsesquioxane in addition to the structure represented by General Formula (2).

[Chemical Formula 4]

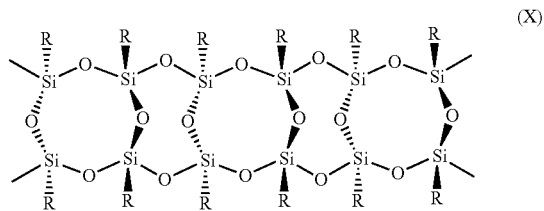

(X)

In Formula (X), R represents a hydroxy group, an alkyl group, or an aryl group.

The structure forming each strut, a chain length thereof, and the interval in the structure forming bridges are not particularly limited, and from the viewpoint of further improving heat resistance and mechanical strength, the ladder-type structure may be a ladder-type structure represented by General Formula (3) below.

[Chemical Formula 5]

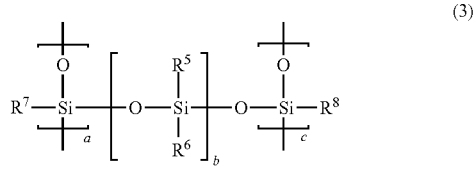

(3)

In Formula (3), $R^5$, $R^6$, $R^7$, and $R^8$ each independently represent an alkyl group or an aryl group, "a" and "c" each independently represent an integer of 1 to 3000, and "b" represents an integer of 1 to 50. Here, examples of the aryl group include a phenyl group and a substituted phenyl group. Further, examples of the substituent of the substituted phenyl group include an alkyl group, a vinyl group, a mercapto group, an amino group, a nitro group, and a cyano group. Furthermore, in Formula (3), in a case where "b" is an integer of 2 or more, two or more groups as $R^5$ may be identical or different, and, similarly, two or more groups as $R^6$ may be identical or different. Still further, in Formula (3), in a case where "a" is an integer of 2 or more, two or more groups as $R^7$ may be identical or different, and, similarly, in a case where "c" is an integer of 2 or more, two or more groups as $R^8$ may be identical or different.

Additionally, from the viewpoint of obtaining more superior flexibility, in Formulas (2) and (3), $R^5$, R, $Rt^7$, and $R^8$ (however, $R^7$ and $R^8$ are only in Formula (3)) are, in one example, each independently an alkyl group having 1 to 6 carbon atoms, a phenyl group, and the like, and examples of this alkyl group include a methyl group. Further, in Formula (3), "a" and "c" can be set each independently to 6 to 2000, and may be 10 to 1000. Furthermore, in Formulas (2) and (3), "b" can be set to 2 to 30, and may be 5 to 20.

Third Aspect

The aerogel of the present embodiment may be a dried product of a wet gel as a condensate of a sol (a product obtained by drying a wet gel produced from the sol: a dried product of a wet gel derived from the sol) containing at least one selected from the group consisting of a silicon compound having a hydrolyzable functional group or a condensable functional group and a hydrolysis product of the silicon compound having a hydrolyzable functional group. Further, the aerogel described hereinbefore may be a product obtained by drying a wet gel produced from a sol containing a silicon compound or the like as described above.

A polysiloxane compound can be used as the silicon compound having a hydrolyzable functional group or a condensable functional group. That is, the sol can contain at least one compound selected from the group consisting of a polysiloxane compound having a hydrolyzable functional group or a condensable functional group and a hydrolysis product of the polysiloxane compound having a hydrolyzable functional group (hereinafter, referred to as "polysiloxane compound group" depending on circumstances).

The functional group in the polysiloxane compound is not particularly limited, and can be a group that reacts with the same functional group or reacts with another functional group. Examples of the hydrolyzable functional group include an alkoxy group. Examples of the condensable functional group include a hydroxyl group, a silanol group, a carboxyl group, and a phenolic hydroxyl group. The hydroxyl group may be included in a hydroxyl group-containing group such as a hydroxyalkyl group. Furthermore, the polysiloxane compound having a hydrolyzable functional group or a condensable functional group may further have a reactive group different from a hydrolyzable functional group and a condensable functional group (a functional group not corresponding to the hydrolyzable functional group and the condensable functional group). Examples of the reactive group include an epoxy group, a mercapto group, a glycidoxy group, a vinyl group, an acryloyl group, a methacryloyl group, and an amino group. The epoxy group may be included in an epoxy group-containing group such as a glycidoxy group. The polysiloxane compound having these functional groups and the reactive group may be used singly or as a mixture of two or more kinds thereof. Examples of these functional groups and the reactive group as a group to improve the flexibility of the aerogel include an alkoxy group, a silanol group, and a hydroxyalkyl group, and among these, an alkoxy group and a hydroxyalkyl group can further improve the compatibility of the sol. Furthermore, from the viewpoints of improving the reactivity of the polysiloxane compound and reducing the thermal conductivity of the aerogel, the number of carbon atoms of the alkoxy group and the hydroxyalkyl group can be set to 1 to 6, and from the viewpoint of further improving the flexibility of the aerogel, the number of carbon atoms thereof may be 2 to 4.

Examples of the polysiloxane compound having a hydroxyalkyl group in the molecule include those having a structure represented by General Formula (A) below. By using the polysiloxane compound having a structure represented by General Formula (A) below, the structures represented by General Formula (1) and Formula (1a) can be introduced into the skeleton of the aerogel.

[Chemical Formula 6]

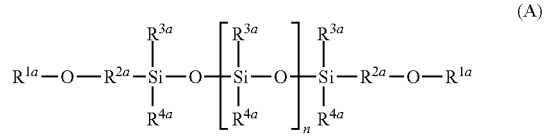

(A)

In Formula (A), Ria represents a hydroxyalkyl group, $R^{2a}$ represents an alkylene group, $R^{3a}$ and $R^{4a}$ each independently represent an alkyl group or an aryl group, and "n" represents an integer of 1 to 50. Here, examples of the aryl group include a phenyl group and a substituted phenyl group. Further, examples of the substituent of the substituted phenyl group include an alkyl group, a vinyl group, a mercapto group, an amino group, a nitro group, and a cyano group. Furthermore, in Formula (A), two groups as $R^{1a}$ may be identical or different, and, similarly, two groups as $R^{2a}$ may be identical or different. Still further, in Formula (A), two or more groups as $R^{3a}$ may be identical or different, and, similarly, two or more groups as $R^{4a}$ may be identical or different.

It becomes much easier to obtain an aerogel having a low thermal conductivity and being flexible by using a wet gel as a condensate of the sol (or produced from the sol) containing the polysiloxane compound having the above-described structure. From such a viewpoint, $R^{1a}$ in Formula (A) is, in one example, a hydroxyalkyl group having 1 to 6 carbon atoms, and the like, and examples of this hydroxyalkyl group include a hydroxyethyl group and a hydroxypropyl group. Furthermore, $R^{2a}$ in Formula (A) is, in one example, an alkylene group having 1 to 6 carbon atoms, and the like, and examples of this alkylene group include an ethylene group and a propylene group. Further, $R^{3a}$ and $R^{4a}$ in Formula (A) are, in one example, each independently an alkyl group having 1 to 6 carbon atoms, a phenyl group, and the like, and examples of this alkyl group include a methyl group. Still further, in Formula (A), "n" can be set to 2 to 30, and may be 5 to 20.

A commercially available product can be used as the polysiloxane compound having the structure represented by the above General Formula (A), and examples thereof include compounds such as X-22-160AS, KF-6001, KF-6002, and KF-6003 (all manufactured by Shin-Etsu Chemical Co., Ltd.), and XF42-B0970 and Fluid OFOH 702-4% (all manufactured by Momentive Performance Materials Inc.).

Examples of the polysiloxane compound having an alkoxy group in the molecule include those having a structure represented by General Formula (B) below. By using the polysiloxane compound having a structure represented by General Formula (B) below, the ladder-type structure having bridges represented by General Formula (2) or (3) can be introduced into the skeleton of the aerogel.

[Chemical Formula 7]

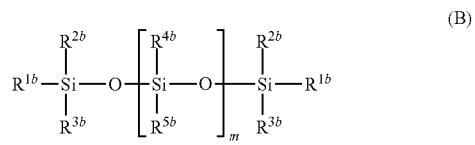

(B)

In Formula (B), $R^{1b}$ represents an alkyl group, an alkoxy group, or an aryl group, $R^{2b}$ and $R^{3b}$ each independently represent an alkoxy group, $R^{4b}$ and $R^{5b}$ each independently represent an alkyl group or an aryl group, and "m" represents an integer of 1 to 50. Here, examples of the aryl group include a phenyl group and a substituted phenyl group. Further, examples of the substituent of the substituted phenyl group include an alkyl group, a vinyl group, a mercapto group, an amino group, a nitro group, and a cyano group. Furthermore, in Formula (B), two groups as $R^{1b}$ may be identical or different, two groups as $R^{2b}$ may be identical or different, and, similarly, two groups as $R^{3b}$ may be identical or different. Still further, in Formula (B), in a case where "m" is an integer of 2 or more, two or more groups as $R^{4b}$ may be identical or different, and, similarly, two or more groups as $R^{5b}$ may be identical or different.

It becomes much easier to obtain an aerogel having a low thermal conductivity and being flexible by using a wet gel as a condensate of the sol (or produced from the sol) containing the polysiloxane compound having the above-described structure or a hydrolysis product thereof. From such a viewpoint, $R^{1b}$ in Formula (B) is, in one example, an alkyl group having 1 to 6 carbon atoms, an alkoxy group having 1 to 6 carbon atoms, and the like, and examples of the alkyl group or the alkoxy group include a methyl group, a methoxy group, and an ethoxy group. Further, $R^{2b}$ and $R^{3b}$ in Formula (B) are, in one example, each independently an alkoxy group having 1 to 6 carbon atoms, and the like, and examples of the alkoxy group include a methoxy group and an ethoxy group. Furthermore, $R^{4b}$ and $R^{5b}$ in Formula (B) are, in one example, each independently an alkyl group having 1 to 6 carbon atoms, a phenyl group, and the like, and examples of the alkyl group include a methyl group. Still further, in Formula (B), "m" can be set to 2 to 30, and may be 5 to 20.

The polysiloxane compound having the structure represented by the above General Formula (B) can be obtained appropriately with reference to any of production methods reported in Japanese Unexamined Patent Publication No. 2000-26609, Japanese Unexamined Patent Publication No. 2012-233110, and the like. Furthermore, XR31-B1410 (manufactured by Momentive Performance Materials Inc.) can also be used as the polysiloxane compound.

Additionally, since an alkoxy group is hydrolyzable, the polysiloxane compound having an alkoxy group is possibly present as a hydrolysis product in the sol, and the polysiloxane compound having an alkoxy group and a hydrolysis product thereof may coexist. Furthermore, in the polysiloxane compound having an alkoxy group, alkoxy groups in the molecule may be totally hydrolyzed or partially hydrolyzed.

The polysiloxane compound having a hydrolyzable functional group or a condensable functional group and a hydrolysis product of the polysiloxane compound having a hydrolyzable functional group may be used singly or as a mixture of two or more kinds thereof.

In production of the aerogel of the present embodiment, as the silicon compound having a hydrolyzable functional group or a condensable functional group, a silicon compound other than the aforementioned polysiloxane compound can be used. That is, the sol containing the above-described silicon compound can contain at least one selected from the group consisting of a silicon compound having a hydrolyzable functional group or a condensable functional group (except a polysiloxane compound) and a hydrolysis product of the silicon compound having a hydrolyzable functional group (hereinafter, referred to as "silicon compound group" depending on circumstances) in addition to the aforementioned polysiloxane compound group or instead of the aforementioned polysiloxane compound group. The number of silicon atoms in the molecule of the silicon compound can be set to 1 or 2.

The silicon compound having a hydrolyzable functional group in the molecule is not particularly limited, and examples thereof include alkylsilicon alkoxide. The number of hydrolyzable functional groups of the alkylsilicon alkoxide can be set to 3 or less from the viewpoint of improving water resistance. Examples of such alkylsilicon alkoxide include monoalkyltrialkoxysilane, monoalkyldialkoxysilane, dialkyldialkoxysilane, monoalkylmonoalkoxysilane, dialkylmonoalkoxysilane, and trialkylmonoalkoxysilane, and specifically, methyltrimethoxysilane, methyldimethoxysilane, dimethyldiethoxysilane, dimethyldimethoxysilane, ethyltrimethoxysilane, and hexyltrimethoxysilane. Here, examples of the hydrolyzable functional group include alkoxy groups such as a methoxy group and an ethoxy group.

The silicon compound having a condensable functional group is not particularly limited, and examples thereof include silanetetraol, methylsilanetriol, dimethylsilanediol, phenylsilanetriol, phenylmethylsilanediol, diphenylsilanediol, n-propylsilanetriol, hexylsilanetriol, octylsilanetriol, decylsilanetriol, and trifluoropropylsilanetriol.

The silicon compound having a hydrolyzable functional group or a condensable functional group may further have the aforementioned reactive group different from a hydrolyzable functional group or a condensable functional group (a functional group not corresponding to the hydrolyzable functional group and the condensable functional group).

As a silicon compound having a reactive group in which the number of hydrolyzable functional groups is 3 or more, vinyltrimethoxysilane, 3-glycidoxypropyltrimethoxysilane, 3-glycidoxypropylmethyldimethoxysilane, 3-methacryloxypropyltrimethoxysilane, 3-methacryloxypropylmethyldimethoxysilane, 3-acryloxypropyltrimethoxysilane, 3-mercaptopropyltrimethoxysilane, 3-mercaptopropylmethyldimethoxysilane, N-phenyl-3-aminopropyltrimethoxysilane, N-2-(aminoethyl)-3-aminopropylmethyldimethoxysilane, and the like can also be used.

Further, as a silicon compound having a condensable functional group and a reactive group, vinylsilanetriol, 3-glycidoxypropylsilanetriol, 3-glycidoxypropylmethylsilanediol, 3-methacryloxypropylsilanetriol, 3-methacryloxypropylmethylsilanediol, 3-acryloxypropylsilanetriol, 3-mercaptopropylsilanetriol, 3-mercaptopropylmethylsilanediol, N-phenyl-3-aminopropylsilanetriol, N-2-(aminoethyl)-3-aminopropylmethylsilanediol, and the like can also be used.

Further, as a silicon compound in which the number of hydrolyzable functional groups at molecular ends is 3 or more, bis(trimethoxysilyl)methane, bis(trimethoxysilyl)ethane, bis(trimethoxysilyl)hexane, ethyltrimethoxysilane, vinyltrimethoxysilane, and the like can also be used.

The silicon compound having a hydrolyzable functional group or a condensable functional group (except a polysiloxane compound) and a hydrolysis product of the silicon compound having a hydrolyzable functional group may be used singly or as a mixture of two or more kinds thereof.

By using the above-described silicon compound (except a polysiloxane compound), the structures represented by General Formulas (4) to (6) below can be introduced into the skeleton of the aerogel. The aerogel of the present embodiment can have one or two or more kinds of these structures.

[Chemical Formula 8]

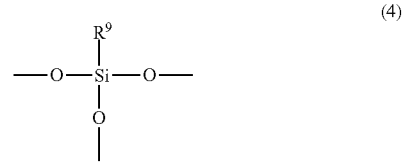

(4)

In Formula (4), $R^9$ represents an alkyl group. Here, examples of the alkyl group include an alkyl group having 1 to 6 carbon atoms, and examples of this alkyl group include a methyl group.

[Chemical Formula 9]

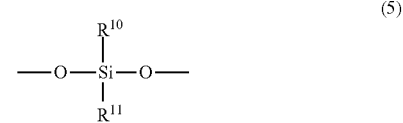

(5)

In Formula (5), $R^{10}$ and $R^{11}$ each independently represent an alkyl group. Here, examples of the alkyl group include an alkyl group having 1 to 6 carbon atoms, and examples of this alkyl group include a methyl group.

[Chemical Formula 10]

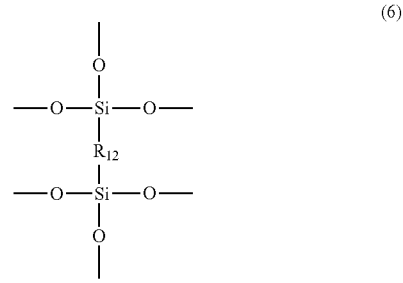

(6)

In Formula (6), $R^{12}$ represents an alkylene group. Here, examples of the alkylene group include an alkylene group having 1 to 10 carbon atoms, and examples of the alkylene group include an ethylene group and a hexylene group.

Fourth Aspect

The aerogel of the present embodiment may further contain silica particles in addition to the aerogel component, from the viewpoint of further strengthening and the viewpoint of achieving further superior thermal insulation properties and flexibility. The aerogel containing an aerogel component and silica particles can also be used as an aerogel composite. The aerogel composite is considered to have a cluster structure that is a characteristic of the aerogel while the aerogel component and the silica particles are compounded and to have a three-dimensional fine porous structure.

The aerogel containing an aerogel component and silica particles can be referred to the aforementioned dried product of the wet gel as a condensate of a sol containing at least one selected from the group consisting of a silicon compound having a hydrolyzable functional group or a condensable functional group and a hydrolysis product of the silicon compound having a hydrolyzable functional group, and silica particles. Therefore, the description related to the first aspect to the third aspect can be appropriately applied to the aerogel of the present embodiment.

Any silica particles can be used as the silica particles without particular limitation, and examples thereof include an amorphous silica particle. Examples of the amorphous silica particles include fused silica particles, fumed silica particles, and colloidal silica particles. Among these, the colloidal silica particles have high monodispersity, and facilitates suppression of aggregation in a sol. Further, the silica particles may be silica particles having a hollow structure, a porous structure, or the like.

The shape of the silica particles is not particularly limited, and examples thereof include a sphere, a cocoon, and an association. Among these, by using spherical particles as the silica particles, it is easy to suppress aggregation in a sol. The average primary particle diameter of the silica particles may be 1 nm or more, 5 nm or more, and 20 nm or more, from the viewpoints of easily imparting appropriate strength and flexibility to the aerogel and easily obtaining aerogel superior in shrinkage resistance in drying. The average primary particle diameter of the silica particles may be 500 nm or less, 300 nm or less, and 100 nm or less, from the viewpoints of easily suppressing solid thermal conduction of the silica particles and easily obtaining aerogel superior in thermal insulation properties. From these viewpoints, the average primary particle diameter of the silica particles may be 1 to 500 nm, 5 to 300 nm, and 20 to 100 nm.

In the present embodiment, the average particle diameter of the aerogel component and the average primary particle diameter of the silica particles can be obtained by direct observation of the aerogel by using a scanning electron microscope (hereinafter, abbreviated as "SEM"). The "diameter" described herein means a diameter in the case of regarding the cross-section of a particle exposed on the cross-section of the aerogel as a circle. Further, the "diameter in the case of regarding the cross-section as a circle" is the diameter of a true circle when the area of the cross-section is replaced with the true circle having the same area. Furthermore, for the calculation of the average particle diameter, the diameter of a circle is obtained for 100 particles, and the average thereof is taken.

Additionally, the average particle diameter of the silica particles can also be measured from a raw material. For example, the two-axis average primary particle diameter is calculated from results of observing 20 arbitrary particles by SEM in the manner that follows. That is, when colloidal silica particles having a solid concentration of 5 to 40% by mass, which is typically dispersed in water, are taken as an example, a chip obtained by cutting a wafer with a wiring pattern into 2 cm square is dipped in a dispersion of the silica particles for about 30 seconds, and then, the chip is rinsed with pure water for about 30 seconds and dried by nitrogen blowing. Thereafter, the chip is placed on a sample table for SEM observation, and the silica particles are observed at a magnification of 100000-fold by applying an accelerating voltage of 10 kV. Twenty silica particles are arbitrarily selected from the obtained image, and the average of the particle diameters of these particles is regarded as the average particle diameter.

The number of silanol groups per 1 g of the silica particles may be $10 \times 10^{18}$ groups/g or more, $50 \times 10^{18}$ groups/g or more, and $100 \times 10^{18}$ groups/g or more, from the viewpoint of easily obtaining aerogel superior in shrinkage resistance. The number of silanol groups per 1 g of the silica particles may be $1000 \times 10^{18}$ groups/g or less, $80 \times 10^{18}$ groups/g or less, and $700 \times 10^{18}$ groups/g or less, from the viewpoint of easily obtaining homogeneous aerogel. From these viewpoints, the number of silanol groups per 1 g of the silica particles may be $10 \times 10^{18}$ to $1000 \times 10^{18}$ groups/g, $50 \times 10^{18}$ to $800 \times 10^{18}$ groups/g, and $100 \times 10^{18}$ to $700 \times 10^{18}$ groups/g.

The content of the polysiloxane compound group (the sum total of the content of the polysiloxane compound having a hydrolyzable functional group or a condensable functional group and the content of the hydrolysis product of the polysiloxane compound having a hydrolyzable functional group) contained in the sol may be 5 parts by mass or more and 10 parts by mass or more with respect to 100 parts by mass of the total amount of the sol, from the viewpoint of easily obtaining favorable reactivity. The content of the polysiloxane compound group contained in the sol may be 50 parts by mass or less and 30 parts by mass or less with respect to 100 parts by mass of the total amount of the sol, from the viewpoint of further easily obtaining favorable compatibility. From these viewpoints, the content of the polysiloxane compound group contained in the sol may be 5 to 50 parts by mass and 10 to 30 parts by mass with respect to 100 parts by mass of the total amount of the sol.

In a case where the sol contains a silicon compound (except a polysiloxane compound), the silicon compound group (the sum total of the content of the silicon compound having a hydrolyzable functional group or a condensable functional group and the content of the hydrolysis product of the silicon compound having a hydrolyzable functional group) may be 5 parts by mass or more and 10 parts by mass or more with respect to 100 parts by mass of the total amount of the sol, from the viewpoint of easily obtaining favorable reactivity. The content of the silicon compound group contained in the sol may be 50 parts by mass or less and 30 parts by mass or less with respect to 100 parts by mass of the total amount of the sol, from the viewpoint of further easily obtaining favorable compatibility. From these viewpoints, the content of the silicon compound group contained in the sol may be 5 to 50 parts by mass and 10 to 30 parts by mass.

In a case where the sol includes both the polysiloxane compound group and the silicon compound group, the ratio between the content of the polysiloxane compound group and the content of the silicon compound group may be 1:0.5 or more and 1:1 or more, from the viewpoint of further easily obtaining favorable compatibility. The ratio between the content of the polysiloxane compound group and the content of the silicon compound group may be 1:4 or less and 1:2 or less, from the viewpoint of further easily suppressing the shrinkage of the gel. From these viewpoints, the ratio between the content of the polysiloxane compound group and the content of the silicon compound group may be 1:0.5 to 1:4 and 1:1 to 1:2.

In a case where the silica particles are contained in the sol, the content of the silica particles may be 1 part by mass or more and 4 parts by mass or more with respect to 100 parts by mass of the total amount of the sol, from the viewpoints of easily imparting appropriate strength to the aerogel and easily obtaining aerogel superior in shrinkage resistance in drying. The content of the silica particles may be 20 parts by mass or less and 15 parts by mass or less with respect to 100 parts by mass of the total amount of the sol, from the viewpoints of easily suppressing solid thermal conduction of the silica particles and easily obtaining aerogel superior in thermal insulation properties. From these viewpoints, the content of the silica particles may be 1 to 20 parts by mass and 4 to 15 parts by mass with respect to 100 parts by mass of the total amount of the sol.

<Aerogel Particles>

The aerogel particles in the present embodiment can be obtained, for example, by crushing bulk aerogel as described below.

The average particle diameter D50 of the aerogel particles can be set to 1 to 1000 m, and may be 3 to 700 μm, 5 to 500 μm, 10 to 100 μm, and 10 to 50 μm. When the average particle diameter D50 of the aerogel particles is 1 μm or more, aerogel particles superior in dispersibility, handleability, and the like are easily obtained. On the other hand, when the average particle diameter D50 is 1000 μm or less, aerogel particles superior in dispersibility are easily obtained. The average particle diameter of the aerogel particles can be appropriately adjusted by the crushing method and conditions for crushing, and the manner of sieving, classification, or the like.

The average particle diameter D50 of the aerogel particles can be measured by using a laser diffraction/scattering method. For example, the aerogel particles are added to a solvent (ethanol) so that the content thereof becomes 0.05 to 5% by mass, and the resultant is vibrated by a 50 W ultrasonic homogenizer for 15 to 30 minutes to disperse the aerogel particle. Thereafter, about 10 mL of the dispersion is injected into a laser diffraction/scattering particle size distribution analyzer, and the particle diameter is measured at 25° C. with a refractive index of 1.3 and an absorption of 0. Then, a particle diameter at 50% of the cumulative value (volume-based) in the particle size distribution is regarded as the average particle diameter D50. As the measurement apparatus, for example, Microtrac MT3000 (manufactured by NIKKISO CO., LTD., product name) can be used.

The specific surface area of the aerogel particles can be set to 1200 $m^2/g$ or less, and may be 1000 $m^2/g$ or less and 900 $m^2/g$ or less. Thereby, a paste superior in film formability is easily prepared. The lower limit of the specific surface area of the aerogel particles is not particularly limited, and can be set to about 30 $m^2/g$ from the viewpoints of suppressing aggregation in the paste and improving a filling rate. Various methods of adjusting the specific surface area of the aerogel particles are considered, and examples thereof include methods of adjusting the amount of the aerogel component having a bridge structure represented by General Formula (2) and of adjusting the amount of the silica particles.

The specific surface area can be measured by a BET method.

As the measurement apparatus, a gas adsorption measurement apparatus (manufactured by Quantachrome Instruments, Autosorb-iQ (Autosorb is a registered trademark)) can be used.

<Method for Producing Aerogel Particles>

The method for producing aerogel particles is not particularly limited, and for example, can be produced by the following method.

The aerogel particles of the present embodiment can be produced by a production method mainly including a sol production step, a wet gel production step in which a sol obtained in the sol production step is gelled and then aged to obtain a wet gel, a washing and solvent replacement step in which the wet gel obtained in the wet gel production step is washed and (as necessary) subjected to solvent replacement, a drying step in which the wet gel washed and subjected to solvent replacement is dried, and a crushing step in which aerogel obtained by drying is crushed.

Furthermore, the aerogel particle may be produced by a production method mainly including the sol production step, the wet gel production step, a wet gel crushing step in which the wet gel obtained in the wet gel production step, the washing and solvent replacement step, and the drying step.

The size of the aerogel particles thus obtained can be further homogenized by sieving, classification, or the like. When the size of the particle is uniformed, dispersibility can be enhanced. Further, "sol" means a state before the occurrence of gelling reaction, and in the present embodiment, a state in which the above-described silicon compound optionally with the silica particles is dissolved or dispersed in a solvent. Furthermore, the wet gel means a gel solid in a wet state which contains a liquid medium but does not have fluidity.

(Sol Production Step)

The sol production step is a step in which the silicon compound optionally with the silica particles (it may be a solvent containing silica particles) are mixed and subjected to a hydrolysis reaction, and then a sol is produced. In this step, in order to accelerate the hydrolysis reaction, an acid catalyst may be further added into the solvent. Furthermore, as shown in Japanese Patent No. 5250900, a surfactant, a thermally-hydrolyzable compound, and the like can also be added into the solvent. Further, for the purpose of suppressing radiation of heat rays, a component such as carbon graphite, an aluminum compound, a magnesium compound, a silver compound, and a titanium compound may be added into the solvent.

As the solvent, for example, water or a mixed solution of water and an alcohol can be used. Examples of the alcohol include methanol, ethanol, n-propanol, 2-propanol, n-butanol, 2-butanol, and t-butanol. Among them, examples of alcohols having a low surface tension and a low boiling point for reduction of the interfacial tension on a gel wall include methanol, ethanol, and 2-propanol. These may be used singly or as a mixture of two or more kinds thereof.

For example, in the case of using an alcohol as the solvent, the amount of the alcohol can be set to 4 to 8 mol, and may be 4 to 6.5 or 4.5 to 6 mol with respect to 1 mol of the total amount of the silicon compound group and the polysiloxane compound group. When the amount of the alcohol is set to 4 mol or more, favorable compatibility is further easily obtained, and when the amount of the alcohol is set to 8 mol or less, the shrinkage of the gel is further easily suppressed.

Examples of the acid catalyst include inorganic acids such as hydrofluoric acid, hydrochloric acid, nitric acid, sulfuric acid, sulfurous acid, phosphoric acid, phosphorous acid, hypophosphorous acid, bromic acid, chloric acid, chlorous acid, and hypochlorous acid; acidic phosphates such as acidic aluminum phosphate, acidic magnesium phosphate, and acidic zinc phosphate; and organic carboxylic acids such as acetic acid, formic acid, propionic acid, oxalic acid, malonic acid, succinic acid, citric acid, malic acid, adipic acid, and azelaic acid. Among them, organic carboxylic acids are exemplified as an acid catalyst to further improve the water resistance of an aerogel to be obtained. Examples of the organic carboxylic acids include acetic acid, and formic acid, propionic acid, oxalic acid, malonic acid, and the like may be used. These may be used singly or as a mixture of two or more kinds thereof.

By using the acid catalyst, the hydrolysis reaction of the silicon compound can be accelerated and the sol can be obtained in a shorter period of time.

The amount of the acid catalyst added can be set to 0.001 to 0.1 parts by mass with respect to 100 parts by mass of the total amount of the polysiloxane compound group and the silicon compound group.

As the surfactant, a nonionic surfactant, an ionic surfactant, and the like can be used. These may be used singly or as a mixture of two or more kinds thereof.

As the nonionic surfactant, for example, a compound including a hydrophilic moiety such as polyoxyethylene and a hydrophobic moiety mainly consisting of an alkyl group, a compound including a hydrophilic moiety such as polyoxypropylene, and the like can be used. Examples of the compound including a hydrophilic moiety such as polyoxyethylene and a hydrophobic moiety mainly consisting of an alkyl group include polyoxyethylene nonyl phenyl ether, polyoxyethylene octyl phenyl ether, and polyoxyethylene alkyl ether. Examples of the compound including a hydrophilic moiety such as polyoxypropylene include polyoxypropylene alkyl ether and a block copolymer of polyoxyethylene and polyoxypropylene.

Examples of the ionic surfactant include a cationic surfactant, an anionic surfactant, and an amphoteric surfactant. Examples of the cationic surfactant include cetyltrimethylammonium bromide and cetyltrimethylammonium chloride, and examples of the anionic surfactant include sodium dodecylsulfonate. Furthermore, examples of the amphoteric surfactant include an amino acid-based surfactant, a betaine-based, surfactant, and an amine oxide-based surfactant. Examples of the amino acid-based surfactant include acylglutamic acid. Examples of the betaine-based surfactant include betaine lauryldimethylaminoacetate and betaine stearyldimethylaminoacetate. Examples of the amine oxide-based surfactant include lauryldimethylamineoxide.

In the wet gel production step described below, these surfactants are considered to act to reduce a difference in chemical affinity between a solvent and a growing siloxane polymer in the reaction system, and thereby suppress phase separation.

The amount of the surfactant added can be set, for example, to 1 to 100 parts by mass with respect to 100 parts by mass of the total amount of the polysiloxane compound group and the silicon compound group, although it depends on the type of the surfactant or the type and amount of the silicon compound. Further, the addition amount may be 5 to 60 parts by mass.

The thermally-hydrolyzable compound is considered to generate a base catalyst through thermal hydrolysis to basify the reaction solution, and accelerate a sol-gel reaction in the wet gel production step described below. Therefore, the thermally-hydrolyzable compound is not particularly limited as long as it is a compound capable of basifying the reaction solution after hydrolysis, and examples thereof include urea; acid amides such as formamide, N-methylformamide, N,N-dimethylformamide, acetamide, N-methylacetamide, and N,N-dimethylacetamide; and cyclic nitrogen compounds such as hexamethylenetetramine. Among them, particularly, urea easily provides the above-described accelerating effect.

The amount of the thermally-hydrolyzable compound added is not particularly limited as long as it is an amount such that a sol-gel reaction can be sufficiently accelerated in the wet gel production step described below. For example, in the case of using urea as the thermally-hydrolyzable compound, the amount of urea added can be set to 1 to 200 parts by mass with respect to 100 parts by mass of the total amount of the polysiloxane compound group and the silicon compound group. Further, the addition amount may be 2 to 150 parts by mass. When the addition amount is set to 1 part by mass or more, favorable reactivity is further easily obtained, and when the addition amount is set to 200 parts by mass or less, precipitation of crystals and a decrease in gel density are further easily suppressed.

The hydrolysis in the sol production step may be performed, for example, for 10 minutes to 24 hours in a temperature environment of 20° C. to 60° C., and may be performed for 5 minutes to 8 hours in a temperature environment of 50° C. to 60° C. although depending on the types and amounts of the silicon compound, the silica particles, the acid catalyst, the surfactant, and the like in the mixed solution. Thereby, the hydrolyzable functional group in the silicon compound is sufficiently hydrolyzed so that a hydrolysis product of the silicon compound can be more reliably obtained.

However, in the case of adding the thermally-hydrolyzable compound into the solvent, the temperature environment of the sol production step may be adjusted to a temperature that suppresses the hydrolysis of the thermally-hydrolyzable compound and suppresses the gelling of the sol. The temperature at this time may be any temperature as long as it is a temperature that can suppress the hydrolysis of the thermally-hydrolyzable compound. For example, in the case of using urea as the thermally-hydrolyzable compound, the temperature environment of the sol production step can be set to 0° C. to 40° C. and may be 10° C. to 30° C.

(Wet Gel Production Step) The wet gel production step is a step in which a sol obtained in the sol production step is gelled and then aged to obtain a wet gel. In this step, a base catalyst can be used in order to accelerate gelling.

Examples of the base catalyst include carbonates such as calcium carbonate, potassium carbonate, sodium carbonate, barium carbonate, magnesium carbonate, lithium carbonate, ammonium carbonate, copper(II) carbonate, iron(II) carbonate, and silver(I) carbonate; hydrogen carbonates such as calcium hydrogen carbonate, potassium hydrogen carbonate, sodium hydrogen carbonate, and ammonium hydrogen carbonate; alkali metal hydroxides such as lithium hydroxide, sodium hydroxide, potassium hydroxide, and cesium hydroxide; ammonium compounds such as ammonium hydroxide, ammonium fluoride, ammonium chloride, and ammonium bromide; basic phosphoric acid sodium salts such as sodium metaphosphate, sodium pyrophosphate, and sodium polyphosphate; aliphatic amines such as allylamine, diallylamine, triallylamine, isopropylamine, diisopropylamine, ethylamine, diethylamine, tirethylamine, 2-ethylhexylamine, 3-ethoxypropylamine, diisobutylamine, 3-(diethylamino)propylamine, di-2-ethylhexylamine, 3-(dibutylamino)propylamine, tetramethylethylenediamine, t-butylamine, sec-butylamine, propylamine, 3-(methylamino)propylamine, 3-(dimethylamino)propylamine, 3-methoxyamine, dimethylethanolamine, methyldiethanolamine, diethanolamine, and triethanolamine; and nitrogen-containing heterocyclic compounds such as morpholine, N-methylmorpholine, 2-methylmorpholine, piperazine and derivatives thereof, piperidine and derivatives thereof, and imidazole and derivatives thereof. Among these, ammonium hydroxide (ammonia water) is superior in terms of not impairing water resistance because of being highly volatile and being less likely to remain in the aerogel particles after drying, and in terms of economic efficiency. The above-described base catalysts may be used singly or as a mixture of two or more kinds thereof.

By using the base catalyst, the dehydration condensation reaction or dealcoholization condensation reaction of the silicon compound and the silica particles in the sol can be accelerated, and the gelling of the sol can be performed in a shorter time. Furthermore, thereby, a wet gel with a higher strength (rigidity) can be obtained. In particular, ammonia is highly volatile and is less likely to remain in the aerogel particles, and thus, by using ammonia as the base catalyst, aerogel particles more superior in water resistance can be obtained.

The amount of the base catalyst added can be set to 0.5 to 5 parts by mass and may be 1 to 4 parts by mass with respect to 100 parts by mass of the total amount of the polysiloxane compound group and the silicon compound group. When the addition amount is set to 0.5 parts by mass or more, the gelling can be performed in a shorter time, and when the addition amount is set to 5 parts by mass or less, reduction in water resistance can be further suppressed.

The gelling of the sol in the wet gel production step may be performed in an airtight container so as not to allow the solvent and the base catalyst to volatilize. The gelling temperature can be set to 30° C. to 90° C. and may be 40° C. to 80° C. When the gelling temperature is set to 30° C. or higher, the gelling can be performed in a shorter time and a wet gel with a higher strength (rigidity) can be obtained. Furthermore, when the gelling temperature is set to 90° C. or lower, the volatilization of the solvent (in particular, an alcohol) is easily suppressed, and thus the gelling can be performed while volume shrinkage is suppressed.

The aging of the sol in the wet gel production step may be performed in an airtight container so as not to allow the solvent and the base catalyst to volatilize. The aging strengthens the bonding of the components constituting a wet gel, and as a result, a wet gel with a sufficiently high strength (rigidity) for suppressing shrinkage in drying can be obtained. The aging temperature can be set to 30° C. to 90° C. and may be 40° C. to 80° C. When the aging temperature is set to 30° C. or higher, a wet gel with a higher strength (rigidity) can be obtained, and when the aging temperature is set to 90° C. or lower, the volatilization of the solvent (in particular, an alcohol) is easily suppressed, and thus the gelling can be performed while volume shrinkage is suppressed.

Furthermore, since it is often difficult to determine when the gelling of the sol is completed, the gelling and subsequent aging of the sol may be sequentially performed in a series of operations.

The gelling time and the aging time can be appropriately set depending on the gelling temperature and the aging temperature. In a case where silica particles are contained in the sol, in particular, the gelling time can be reduced as compared with a case where a silica particle is not contained. The reason for this is speculated that the silanol group or the reactive group of the silicon compound in the sol forms hydrogen bonding or chemical bonding with the silanol group of the silica particles. Further, the gelling time can be set to 10 to 120 minutes and may be 20 to 90 minutes. When the gelling time is set to 10 minutes or longer, a more homogeneous wet gel is easily obtained, and when the gelling time is set to 120 minutes or shorter, the simplification of a washing and solvent replacement step through a drying step which will be described below is possible. Further, total time of the gelling time and aging time, as a total of the step of gelling and aging, can be set to 4 to 480 hours, and may be 6 to 120 hours. When the total of the gelling time and the aging time is set to 4 hours or longer, a wet gel with a higher strength (rigidity) can be obtained, and when the total of the gelling time and the aging time is set to 480 hours or shorter, the effect of aging is more easily maintained.

In order to decrease the density of aerogel particles to be obtained and increase an average pore diameter thereof, the gelling temperature and the aging temperature may be increased within the above-described range, or the total time of the gelling time and the aging time may be prolonged within the above-described range. Furthermore, in order to increase the density of aerogel particles to be obtained and decrease an average pore diameter thereof, the gelling temperature and the aging temperature may be decreased within the above-described range, or the total time of the gelling time and the aging time may be shortened within the above-described range.

(Wet Gel Crushing Step)

In the case of performing the wet gel crushing step, the wet gel obtained in the wet gel production step is crushed. The crushing can be performed, for example, by placing the wet gel in a Henschel mixer or performing the wet gel production step in a mixer and operating the mixer under appropriate conditions (rotational frequency and duration). Furthermore, more simply, the crushing can be performed by placing the wet gel in a sealable container or performing the wet gel production step in a sealable container and shaking the wet gel for an appropriate duration with a shaking apparatus such as a shaker. Furthermore, as necessary, the particle diameter of the wet gel can also be adjusted by using a jet mill, a roller mill, a bead mill, or the like.

(Washing and Solvent Replacement Step)

The washing and solvent replacement step has a step of washing the wet gel obtained by the wet gel production step or the wet gel crushing step (washing step) and a step of replacing the washing liquid in the wet gel with a solvent suitable for drying conditions (drying step described below) (solvent replacement step). Although the washing and solvent replacement step can be carried out in an aspect of performing only the solvent replacement step without performing the step of washing the wet gel, the wet gel may be washed from the viewpoint of reducing impurities such as unreacted products and by-products in the wet gel and permitting production of aerogel particles having higher purity.

In the washing step, the wet gel obtained by the wet gel production step or the wet gel crushing step is washed. The washing can be repeatedly performed, for example, by using water or an organic solvent. In this case, washing efficiency can be improved by heating.

As the organic solvent, various organic solvents such as methanol, ethanol, 1-propanol, 2-propanol, 1-butanol, acetone, methyl ethyl ketone, 1,2-dimethoxyethane, acetonitrile, hexane, toluene, diethyl ether, chloroform, ethyl acetate, tetrahydrofuran, methylene chloride, N,N-dimethylformamide, dimethyl sulfoxide, acetic acid, and formic acid can be used. The above-described organic solvents may be used singly or as a mixture of two or more kinds thereof.

In the solvent replacement step described below, a solvent with low surface tension can be used in order to suppress the shrinkage of the gel caused by drying. However, the solvent with low surface tension generally has very low mutual solubility in water. Therefore, in the case of using the solvent with low surface tension in the solvent replacement step, as the organic solvent to be used in the washing step, a hydrophilic organic solvent having high mutual solubility in both of water and the solvent with low surface tension is exemplified. Further, the hydrophilic organic solvent to be used in the washing step can play a role in preliminary replacement for the solvent replacement step. Among the above-described organic solvents, examples of the hydrophilic organic solvent include methanol, ethanol, 2-propanol, acetone, and methyl ethyl ketone. Additionally, methanol, ethanol, methyl ethyl ketone, and the like are superior in terms of economic efficiency.

The amount of water or the organic solvent to be used in the washing step can be set to an amount that can sufficiently replace the solvent in the wet gel and permit washing. The amount can be set to 3 to 10 times the volume of the wet gel. The washing can be repeated until the moisture content in the wet gel after washing becomes 10% by mass or less with respect to the mass of silica.

The temperature environment in the washing step can be a temperature equal to or lower than the boiling point of the solvent to be used in washing, and for example, in the case of using methanol, heating can be performed at a temperature of about 30° C. to 60° C.

In the solvent replacement step, the solvent of the washed wet gel is replaced with a predetermined solvent for replacement in order to suppress the shrinkage of the aerogel in the drying step. In this case, replacement efficiency can be improved by heating. As the solvent for replacement, specifically, in the drying step, in the case of drying under an atmospheric pressure at a temperature lower than the critical point of the solvent to be used in drying, solvents with low surface tension described below are exemplified. On the other hand, in the case of performing supercritical drying, as the solvent for replacement, for example, solvents such as ethanol, methanol, 2-propanol, dichlorodifluoromethane, and carbon dioxide or a mixed solvent of two or more of these are exemplified.

As the solvent with low surface tension, a solvent whose surface tension at 20° C. is 30 mN/m or less is exemplified. Further, the surface tension may be 25 mN/m or less or 20 mN/m or less. Examples of the solvent with low surface tension include aliphatic hydrocarbons such as pentane (15.5), hexane (18.4), heptane (20.2), octane (21.7), 2-methylpentane (17.4), 3-methylpentane (18.1), 2-methylhexane (19.3), cyclopentane (22.6), cyclohexane (25.2), and 1-pentene (16.0); aromatic hydrocarbons such as benzene (28.9), toluene (28.5), m-xylene (28.7), and p-xylene (28.3); halogenated hydrocarbons such as dichloromethane (27.9), chloroform (27.2), carbon tetrachloride (26.9), 1-chloropropane (21.8), and 2-chloropropane (18.1); ethers such as ethyl ether (17.1), propyl ether (20.5), isopropyl ether (17.7), butyl ethyl ether (20.8), and 1,2-dimethoxyethane (24.6); ketones such as acetone (23.3), methyl ethyl ketone (24.6), methyl propyl ketone (25.1), and diethyl ketone (25.3); and esters such as methyl acetate (24.8), ethyl acetate (23.8), propyl acetate (24.3), isopropyl acetate (21.2), isobutyl acetate (23.7), and ethyl butyrate (24.6) (the surface tension at 20° C. is indicated within the parentheses, and the unit is [mN/m]). Among these, aliphatic hydrocarbons (such as hexane and heptane) have low surface tension and are superior in working environmental performance. Further, among these, hydrophilic organic solvents such as acetone, methyl ethyl ketone, and 1,2-dimethoxyethane are used, and thereby can also serve as the organic solvent in the above-described washing step. Furthermore, among these, a solvent whose boiling point at normal pressure is 100° C. or lower may be used from the viewpoint that drying in the drying step is easy. The above-described solvents may be used singly or as a mixture of two or more kinds thereof.

The amount of the solvent to be used in the solvent replacement step can be set to an amount that can sufficiently replace the solvent in the wet gel after washing. The amount can be set to 3 to 10 times the volume of the wet gel.

The temperature environment in the solvent replacement step can be a temperature equal to or lower than the boiling point of the solvent to be used in replacement, and for example, in the case of using heptane, heating can be performed at a temperature of about 30° C. to 60° C.

Further, in a case where silica particles are contained in the gel, the solvent replacement step is not essential. A speculated mechanism is as follows. That is, the silica particles function as a support of a three-dimensional network skeleton, and thereby the skeleton is supported so that the shrinkage of the gel in the drying step is suppressed. Therefore, it is considered that the gel can be directly subjected to the drying step without replacing the solvent used in washing. As described above, by using the silica particles, the simplification of the washing and solvent replacement step through the drying step is possible.

(Drying Step)

In the drying step, the wet gel washed and (as necessary) subjected to solvent replacement as described above is dried. Thereby, aerogel (an aerogel block or aerogel particles) can be obtained. That is, aerogel obtained by drying the wet gel produced from the above-described sol can be obtained.

The drying method is not particularly limited, and known drying under normal pressure, supercritical drying, or freeze drying can be used. Among these, from the viewpoint of easily producing low-density aerogel, drying under normal pressure or supercritical drying can be used. Further, from the viewpoint that production at a low cost is possible, drying under normal pressure can be used. Furthermore, in the present embodiment, the normal pressure means 0.1 MPa (atmospheric pressure).

The aerogel can be obtained by drying the wet gel washed and (as necessary) subjected to solvent replacement under an atmospheric pressure at a temperature lower than the critical point of the solvent used in drying. The drying temperature can be set to 20° C. to 150° C. although varying depending on the type of the replaced solvent (a solvent used in washing in the case of not performing solvent replacement), in consideration that drying at a high temperature particularly increases the evaporation rate of the solvent and, in some cases, generates a large crack in the gel. Further, the drying temperature may be 60° C. to 120° C. Furthermore, the drying time varies depending on the volume of the wet gel and the drying temperature, and can be set to 4 to 120 hours. Still further, acceleration of drying by applying a pressure lower than the critical point within a range not inhibiting productivity is also encompassed in the concept of drying under normal pressure.

The aerogel can also be obtained by subjecting the wet gel washed and (as necessary) subjected to solvent replacement to supercritical drying. The supercritical drying can be performed by a known method. Examples of the method for supercritical drying include a method of removing the solvent contained in the wet gel at a temperature and pressure equal to or higher than the critical point of the solvent. Alternatively, examples of the method for supercritical drying include a method in which the wet gel is immersed in liquified carbon dioxide, for example, under conditions of about 20° C. to 25° C. and 5 to 20 MPa to entirely or partially replace the solvent contained in the wet gel with carbon dioxide, which has a critical point lower than the solvent, and single carbon dioxide or a mixture of carbon dioxide and the solvent is then removed.

The aerogel obtained by drying under normal pressure or supercritical drying as describe above may be further subjected to additional drying under normal pressure at 105° C. to 200° C. for 0.5 to 2 hours. Thereby, aerogel having a low density and small pores is further easily obtained. The additional drying may be performed under normal pressure at 150° C. to 200° C.

(Crushing Step)

In the case of not performing the wet gel crushing step, the aerogel obtained by drying (aerogel block) is crushed to obtain aerogel particles. For example, this can be achieved by placing the aerogel in a jet mill, a roller mill, a bead mill, a hammer mill, or the like, and operating the mill with an appropriate rotational frequency for an appropriate duration.

<Paste for Suppressing Corrosion Under Insulation>

The paste for suppressing corrosion under insulation includes aerogel particles and a liquid medium. The paste for suppressing corrosion under insulation can also be a mixture of aerogel particles and a liquid medium. The liquid medium may be filled in pores of the aerogel particle in the paste.

The paste may further comprise a binder resin. The binder resin has a function of bonding the aerogel particles after forming a coating film. Examples of the binder resin include an epoxy resin, a silicone resin, a phenolic resin, a urea resin, a melamine resin, a polyurethane resin, a polyethylene resin, a polypropylene resin, a polystyrene resin, a polyester resin, an acrylic resin (a polymer including acrylic acid ester or methacrylic acid ester as a main structural unit), an acrylic acid-based resin (a polymer including an acrylic acid, an acrylate, methacrylic acid, and a methacrylate as structural units), a polyvinyl chloride resin, a polyvinyl acetate resin, a polyamide resin, a polyimide resin, cellulose-based resin, polyvinyl alcohol, polyvinylpyrrolidone, polyethylene oxide, and polyethyleneglycol. A first binder resin and a second binder resin described below may be selected from these.

The binder resin can comprise particularly a first binder resin and a second binder resin. The first binder resin and the second binder resin have a function of bonding the aerogel particles after forming a coating film. Both of the first binder resin and the second binder resin are dissolved in the liquid medium, and the solubility of the first binder resin with respect to the liquid medium is higher than the solubility of the second binder resin with respect to the liquid medium.

The first binder resin and the second binder resin as described above are comprised in the paste, and thereby a coating film superior in a coating film strength and adhesion is obtained. The reason for this is not necessarily clear, and the present inventors speculate as follows. Since the solubility with respect to the liquid medium is different between the first binder resin and the second binder resin, in the drying step at the time of forming a coating film (a step of removing the liquid medium), the second binder resin is saturated with respect to the liquid medium before the first binder resin, and the second binder resin is likely to be firstly precipitated. By such a difference in solubility, a characteristic binder structure is formed at the time of forming a coating film, and thus a superior coating film strength and superior adhesion are considered to be obtained.

The reason why the aforementioned characteristic binder structure is obtained is not necessarily clear, and for example, it is speculated that the second binder resin is firstly bonded onto the aerogel particles (and a fibrous substance described below) and the first binder resin is bonded between the aerogel particles (or between the aerogel particles and the fibrous substance or between the fibrous substances) via the second binder resin so that a superior coating film strength and superior adhesion are obtained. Further, the second binder resin becomes particulate to be filled between the aerogel particles and is then bonded to the first binder resin, and thereby it is also considered that the aerogel particles are firmly bonded.

In the present embodiment, the content of the second binder resin is preferably greater than the content of the first binder resin. Thereby, the aforementioned effects are more significantly exhibited. The content of the second binder resin is preferably more than 100 parts by mass and more preferably 500 parts by mass or more, and may be 1000 parts by mass or more and 2000 parts by mass or more, with respect to 100 parts by mass of the first binder resin.

Furthermore, the content of the second binder resin may be 10000 parts by mass or less, is preferably 7000 parts by mass or less, and may be 5000 parts by mass or less and 3000 parts by mass or less, with respect to 100 parts by mass of the first binder resin, from the viewpoint of having superior thermal insulation performance.

The total content of the first binder resin and the second binder resin (it can also be referred to as the content of the binder resin) may be, for example, 5 parts by mass or more, and is preferably 10 parts by mass or more, more preferably 50 parts by mass or more, and further preferably 100 parts by mass or more, with respect to 100 parts by mass of the aerogel particles. Thereby, the aerogel particles are likely to firmly bond to each other by the binder resin, and thus the strength of the coating film is further improved.

Furthermore, the total content of the first binder resin and the second binder resin may be, for example, 500 parts by mass or less, and is preferably 300 parts by mass or less, more preferably 250 parts by mass or less, and further preferably 200 parts by mass or less, with respect to 100 parts by mass of the aerogel particles. Thereby, the proportion of the aerogel particles in the coating film is increased, and thus thermal insulation properties of the coating film are further improved.

The first binder resin has a function of bonding the aerogel particles after forming a coating film and may be a resin that can be dissolved in the liquid medium. For example, when the liquid medium is a water-based solvent, examples of the first binder resin include a cellulose-based resin, an acrylic acid-based resin, polyvinyl alcohol, polyvinylpyrrolidone, polyethylene oxide, and polyethyleneglycol. Among these, from the viewpoint of having superior thickening properties, a cellulose-based resin and an acrylic acid-based resin can be suitably used.

Examples of the cellulose-based resin include hydroxypropylmethylcellulose, ammonium carboxymethylcellulose, and hydroxyethylmethylcellulose.

Examples of the acrylic acid-based resin include polyacrylic acid, an acrylic acid copolymer, a polyacrylate, and an acrylate copolymer.

The second binder resin may be a resin that can be dissolved in the liquid medium and has lower solubility with respect to the liquid medium than the first binder resin. The second binder resin may be a thermoplastic resin and a thermosetting resin.

Examples of the thermoplastic resin include an acrylic resin, polyvinyl alcohol, polypropylene, and polyvinyl chloride. Among these, from the viewpoint of handleability, an acrylic resin and polyvinyl alcohol can be suitably used.

Examples of the thermosetting resin include an epoxy resin, a silicone resin, and polyurethane. Among these, from the viewpoint of having superior in heat resistance, an epoxy resin and a silicone resin can be suitably used.

When the second binder resin is a thermosetting resin, the coating film may further contain a curing agent. The curing agent is not particularly limited, and may be appropriately changed according to the type of the thermosetting resin. For example, when the thermosetting resin is an epoxy resin, a known epoxy resin curing agent can be used as the curing agent. Examples of the epoxy resin curing agent include an amine-based curing agent, an acid anhydride-based curing agent, and a polyamide-based curing agent, and from the viewpoint of reactivity, an amine-based curing agent and a polyamide-based curing agent can be suitably used.

Examples of the liquid medium includes water and an organic solvent. The organic solvent is not particularly limited as long as it can disperse the aerogel particles, and examples thereof include aromatic hydrocarbons such as toluene, xylene, mesitylene, cumene, and p-cymene; aliphatic hydrocarbons such as hexane, heptane, and pentane; ethers such as diethyl ether, tetrahydrofuran, and 1,4-dioxane; alcohols such as methanol, ethanol, isopropanol, butanol, ethylene glycol, and propylene glycol; ketones such as acetone, methyl ethyl ketone, methyl isobutyl ketone, cyclohexanone, and 4-hydroxy-4-methyl-2-pentanone; esters such as methyl acetate, ethyl acetate, and butyl acetate; and amides such as N,N-dimethylformamide, N,N-dimethyl acetamide, and N-methylpyrrolidone. Among these, from the viewpoints of volatility, boiling point, and the like, alcohols and ketones can be used, and alcohols can be particularly suitably used. Alcohols and ketones are easy to mix with water, a water-based resin, or the like, and thus are also suitable when used in combination with those components.

In a preferred embodiment, the liquid medium is preferably a water-based solvent containing water. The water-based solvent may be water and may be a mixed solvent containing water and an organic solvent. By such a liquid medium, the dispersibility of the aerogel particles is improved, and a uniform coating film is easily obtained.

The paste may further contain a fibrous substance. By using such a paste, the aerogel particles are boned to the fibrous substance in the coating film, and thus the falling of the aerogel particles from the coating film is prevented by the anchor effect. Furthermore, the fibrous substance is dispersed in the coating film, and thereby the strength of the coating film is further improved.

Examples of the fibrous substance include organic fibers and inorganic fibers. Examples of the organic fibers include polyamide-based, polyimide-based, polyvinyl alcohol-based, polyvinylidene chloride-based, polyvinyl chloride-based, polyester-based, polyacrylonitrile-based, polyethylene-based, polypropylene-based, polyurethane-based, phenol-based, polyether ester-based, and polylactic acid-based organic fibers. Examples of the inorganic fibers include glass fibers, carbon fibers, ceramic fibers, and metallic fibers.

The fiber length of the fibrous substance is not particularly limited, and for example, is preferably 1.5 mm or more, more preferably 2 mm or more, and further preferably 2.5 mm or more. The upper limit of the fiber length of the fibrous substance is not particularly limited, and for example, may be 20 mm or less from the viewpoint of dispersibility in the paste.

The fiber diameter of the fiber can be set to 0.01 to 100 μm from the viewpoints of dispersibility in the paste, a favorable anchor function, and the like.

The content of the fibrous substance is not particularly limited, and for example, is preferably 5 parts by mass or more, more preferably 7 parts by mass or more, and further preferably 9 parts by mass or more, with respect to 100 parts by mass of the aerogel particles. Thereby, the anchor effect by the fibrous substance is likely to be obtained, and the coating film strength is further improved.

Furthermore, the content of the fibrous substance is, for example, preferably 25 parts by mass or less, more preferably 20 parts by mass or less, and further preferably 15 parts by mass or less, with respect to 100 parts by mass of the aerogel particles. Thereby, the proportion of the aerogel particles in the coating film is increased, and thus thermal insulation properties of the coating film are further improved.

The paste may further contain components other than the above-described components. Examples of the other components include a thickening agent, a pigment, a leveling agent, and a film forming aid. Further, examples of the thickening agent include an organic polymer, a layered inorganic additive, and fumed silica.

The concentration of the paste is not particularly limited, and may be appropriately varied according to a desired thickness of a coating film, a coating method, and the like. For example, the content of the aerogel particles in the paste may be 5 to 30% by mass and 5 to 25% by mass based on the total amount of the paste.

The total content of the first binder resin and the second binder resin in the paste (it also can be referred to the content of the binder resin) can be set to 1 to 40% by mass and may be 1 to 30% by mass from the viewpoints of bonding property between the aerogel particles, thermal insulation properties of the coating film, and the like.

The content of the fibrous substance in the paste can be set to 0.01 to 30% by mass and may be 0.1 to 10% by mass from the viewpoints of dispersibility in the paste, expression property of an anchor function, and the like.

The content of the thickening agent can be appropriately adjusted to have a desired paste viscosity (for example, 1000 mPa-s or more). The viscosity of the paste can also be improved by mixing a binder resin, and thus in this case, it is not necessarily required to mix a thickening agent.

Additionally, the paste for suppressing corrosion under insulation may include other porous particles in addition to or instead of the aerogel particles. That is, the paste for suppressing corrosion under insulation may include porous particles and a liquid medium. Examples of the porous particles include inorganic porous particles and organic porous particles. Examples of a constituent material of the inorganic porous particles include a metal oxide (including a composite oxide), a hydroxide, a nitride, a carbide, a carbonate, a borate, a sulfate, a silicate, and a phosphate. Specific examples thereof include metal oxides such as silica, titanium oxide, zinc oxide, alumina, zircon oxide, tin oxide, magnesium oxide, and potassium titanate; hydroxides such as aluminum hydroxide, magnesium hydroxide, and calcium hydroxide; nitrides such as silicon nitride, titanium nitride, and aluminum nitride; carbides such as silicon carbide and titanium carbide; carbonates such as calcium carbonate and magnesium carbonate; borates such as aluminum borate and magnesium borate; sulfates such as calcium sulfate and magnesium sulfate; silicates such as calcium silicate and magnesium silicate; and phosphates such as calcium phosphate. Other than, as the above-described constituent material, glass, zeolite, the above-described aerogel, and the like can be used. Examples of a constituent material of the organic porous particles include charcoal, activated carbon, a polymeric porous sintered body, resin foam, and a silicone porous body.

The paste of the present embodiment can be suitably used for providing an insulation capable of suppressing pipe corrosion with respect to various pipes of a large-scale facility such as a plant or a power plant. However, in a situation in which a phenomenon similar to corrosion under insulation in a pipe occurs, the paste can be utilized, and for example, can achieve a reduction in energy loss in middle-size or small-size devices of home electrical appliance, automobiles, and the like.

<Method for Suppressing Corrosion Under Insulation>

The method for suppressing corrosion under insulation comprises a step of applying a paste comprising aerogel particles and a liquid medium to a target surface to form a coating film. More specifically, the method for suppressing corrosion under insulation may comprise the step of applying a paste to a target surface and a step of removing the liquid medium from the paste applied to the target surface to obtain a coating film. The method for suppressing corrosion under insulation may comprise a step of applying a paste comprising porous particles and a liquid medium to a target surface to form a coating film.

Further, a coating film as a dried product of the paste is formed on the target surface by the suppression method, and this coating film functions as an insulation in the target surface. Therefore, the method for suppressing corrosion under insulation can also said to be a thermal insulation method of a target which can suppress corrosion under insulation.

The method of applying the paste to a target surface is not particularly limited, and for example, as shown in FIG. 1, the paste can be applied to the target surface by using a trowel (metallic spatula) or the like. Thereby, a coating film having such a thickness that is difficult to realize with a conventional thermal insulation coating material can be formed in a short time. Specifically, with the paste of the present embodiment, a coating film having a thickness of at least about 2 mm can be formed by one application, and extremely high operating efficiency as compared with a conventional coating material with which only a coating film having a thickness of about 0.5 mm is obtained can be realized. Furthermore, the paste comprises aerogel particles, and thus a coating film superior in thermal insulation performance as compared with a conventional thermal insulation coating material can be obtained.

Thereafter, the applied paste is left in an environment at 0° C. to 40° C. or the paste is subjected to one or both of a heating (for example, 40° C. to 150° C.) treatment, a depressurization (for example, 10000 Pa or less) treatment, and thereby the liquid medium may be removed.

When the second binder resin is a thermosetting resin, a step of curing the second binder resin after application may be carried out. In the present embodiment, for example, the liquid medium may be removed, and then the second binder resin may be cured. That is, the step of removing the liquid medium and the step of curing the second binder resin may be carried out in this order. Furthermore, in the present embodiment, for example, the second binder resin may be cured at the same time of removal of the liquid medium. That is, removal of the liquid medium and curing of the second binder resin may be carried out at the same time.

From the viewpoint of suppressing corrosion under insulation in a pipe or the like, a target to which the paste is applied is a metal material, and examples of such a metal material include carbon steel and stainless steel. However, from the viewpoint of providing an insulation closely to a target surface, it is not excluded that ceramic, glass, a resin, a composite material of these, and the like are used in addition to the metal as a material constituting a target.

From the viewpoint that the paste can be applied not only to a straight pipe part of the pipe but also to a place such as a flange part or a bend part without particular limitations, the shape of the target surface may be a complicated shape. Even with respect to a target object to which an insulation material having a planar shape such as a sheet shape or a board shape is difficult to attach, by using the paste, a thermal insulating layer can be provided on this surface.

<Coating Film (Insulation)>

A coating film containing aerogel particles, a binder resin, and the like can be obtained by the paste for suppressing corrosion under insulation.

The content of the aerogel particles in the coating film can be set to, for example, 8% by mass or more, and may be 20% by mass or more and 40% by mass or more. Thereby, the coating film density is decreased, and the thermal insulation properties of the coating film are further improved. The content of the aerogel particles in the coating film can be set to, for example, 92% by mass or less and may be 85% by mass or less. Thereby, there is a tendency that a coating film is easily formed.

The total content of the first binder resin and the second binder resin in the coating film (it also can be referred to the content of the binder resin) can be set to, for example, 8% by mass or more and may be 20% by mass or more and 40% by mass or more. Thereby, the aerogel particles are likely to firmly bond to each other by the binder resin, and thus the strength of the coating film is further improved. The total content of the first binder resin and the second binder resin in the coating film can be set to, for example, 92% by mass or less and may be 85% by mass or less. Thereby, there is a tendency that the proportion of the aerogel particles in the coating film is increased, and thus thermal insulation properties of the coating film are further improved.

The thickness of the coating film is not particularly limited, and for example, may be 0.01 to 5 mm.

The coating film has favorable water repellency since the aerogel particles of the present embodiment have hydrophobicity. That is, performance degradation (for example, a decrease in thermal insulation properties) caused by the coating film including water is less likely to occur, and the exchange frequency of the coating film can be reduced. Furthermore, because of favorable water repellency, it is not necessary to provide a sheathing material for protecting a coating film. The water repellency can be evaluated by measuring a contact angle between the coating film and water. The contact angle can be set to 90° or more, and may be 110° or more and 130 or more. The contact angle of the coating film can be adjusted, for example, by the content of the aerogel particles in the coating film, the type and content of the liquid medium, and the like.

The coating film has favorable heat resistance. The heat resistance can be evaluated by measuring a temperature at the time of 5% weight reduction of the coating film. For example, in the case of performing measurement by using a simultaneous thermogravimetric analyzer-differential thermal analyzer while increasing a temperature to 500° C. under a condition of a temperature increase rate of 10° C./min, the temperature at the time of 5% weight reduction can be set to 150° C. or higher and may be 200° C. or higher and 250° C. or higher. The heat resistance of the coating film can be adjusted, for example, by the type of the binder resin, the content thereof in the coating film, and the like.

The coating film has an extremely low thermal conductivity. For example, the thermal conductivity of the coating film at 25° C. under an atmospheric pressure can be set to 0.05 W/m-K or less and may be 0.04 W/m·K of less. Thereby, it is possible to obtain thermal insulation properties that are in no way inferior to polyurethane foam serving as a high-performance insulation material. Incidentally, the lower limit of the thermal conductivity is not particularly limited, and for example, can be set to 0.01 W/m-K. The thermal conductivity can be measured, for example, by using a thermal conductivity analyzer based on a steady state method "HFM 436 Lambda" (manufactured by NETZSCH, product name, HFM 436 Lambda is a registered trademark) according to a steady state method.

EXAMPLES

Next, the present invention will be described in more detail by means of the following Examples; however, these Examples are not intended to limit the present invention.

(Preparation of Aerogel Particles A)

100.0 parts by mass of PL-2L (manufactured by FUSO CHEMICAL CO., LTD., product name) as a silica particle-containing raw material, 80.0 parts by mass of water, 0.5 parts by mass of acetic acid as an acid catalyst, 1.0 part by mass of cetyltrimethylammonium bromide (manufactured by Wako Pure Chemical Industries, Ltd.) as a cationic surfactant, and 150.0 parts by mass of urea as a thermally-hydrolyzable compound were mixed, 60.0 parts by mass of methyltrimethoxysilane (manufactured by Shin-Etsu Chemical Co., Ltd., product name: KBM-13), 20.0 parts by mass of dimethyldimethoxysilane (manufactured by Shin-Etsu Chemical Co., Ltd., product name: KBM-22) as silicon compounds, and 20.0 parts by mass of a both terminally difunctional alkoxy-modified polysiloxane compound having a structure represented by the above General Formula (B) (hereinafter, referred to as "polysiloxane compound A") were added thereto, and the resultant was reacted at 25° C. for 2 hours to obtain a sol. The obtained sol was gelled at 60° C. and then aged at 60° C. for 48 hours to obtain a wet gel.

Furthermore, the above-described "polysiloxane compound A" was synthesized as follows. First, in a 1 L three-neck flask equipped with a stirrer, a thermometer and a Dimroth condenser, 100.0 parts by mass of dimethylpolysiloxane XC96-723 having silanol groups at both ends (manufactured by Momentive Performance Materials Inc., product name), 181.3 parts by mass of methyltrimethoxysilane, and 0.50 parts by mass of t-butylamine were mixed and reacted at 30° C. for 5 hours. Thereafter, this reaction solution was heated under reduced pressure of 1.3 kPa at 140° C. for 2 hours to remove volatile matter, thereby a both terminally difunctional alkoxy-modified polysiloxane compound (polysiloxane compound A) was obtained.

Thereafter, the obtained wet gel was transferred to a plastic bottle and the plastic bottle was sealed, and then the wet gel was crushed by using an Extreme Mill (manufactured by AS ONE Corporation, MX-1000XTS) at 27000 rpm for 10 minutes to obtain a particulate wet gel. The obtained particulate wet gel was immersed in 2500.0 parts by mass of methanol and washed at 25° C. over 24 hours. This washing operation was performed three times in total while methanol was replaced with another one in each washing. Next, the washed particulate wet gel was immersed in 2500.0 parts by mass of heptane as a solvent with low surface tension and subjected to solvent replacement at 25° C. over 24 hours. This solvent replacement operation was performed three times in total while heptane was replaced with another one in each solvent displacement. The particulate wet gel washed and subjected to solvent replacement was dried under normal pressure at 40° C. for 96 hours and then further dried at 150° C. for 2 hours. Finally, the particulate wet gel was sieved (manufactured by TOKYO SCREEN CO., LTD., mesh size: 45 µm, wire diameter: 32 m) to obtain aerogel particles A having structures represented by the above General Formulas (3), (4), and (5).

(Preparation for Aerogel Particles B)

JIOS AeroVa (registered trademark, manufactured by JIOS AEROGEL CORPORATION, product name) was provided as aerogel particles B.

(Specific Surface Area Measurement of Aerogel Particles)

The BET specific surface area of the aerogel particles was measured by using a gas adsorption measurement apparatus (manufactured by Quantachrome Instruments, Autosorb-iQ (Autosorb is a registered trademark)). The specific surface area of the aerogel particles A was 125 $m^2/g$, and the specific surface area of the aerogel particles B was 716 $m^2/g$.

(Average Particle Diameter Measurement of Aerogel Particles)

The aerogel particles were added to ethanol so that contents thereof became 0.5% by mass, and the resultant was vibrated with a 50 W ultrasonic homogenizer for 20 minutes, thereby preparing a dispersion. 10 mL of the obtained dispersion was injected into Microtrac MT3000 (manufactured by NIKKISO CO., LTD., product name), and the particle diameter was measured at 25° C. with a refractive index of 1.3 and an absorption of 0. Then, the particle diameter at 50% of the cumulative value (volume-based) in the obtained particle size distribution was regarded as the average particle diameter D50. The average particle diameter D50 of the aerogel particles A was 20 µm, and the average particle diameter D50 of the aerogel particles B was 17 µm.

Example 1

15 parts by mass of a N-vinylacetamide-sodium polyacrylate copolymer resin (manufactured by Showa Denko K.K., product name: adHERO GE-167), 10 parts by mass of glass fibers (chopped strand, fiber diameter: 13 m, fiber length: 3 mm), 100 parts by mass of the aerogel particles B, 200 parts by mass of an acrylic resin (manufactured by DIC Corporation, product name: DV-759EF, solid content: 40 wt %), 20 parts by mass of isopropyl alcohol, and 150 parts by mass of water were mixed to obtain a paste 1.

<Measurement of Peeling Strength>

The paste 1 was applied onto an aluminum foil (manufactured by UACJ Corporation, product name: MYFOIL thickness type 50, thickness: 50 µm) by using a metallic spatula so that the thickness after drying became 2 mm, and dried for 2 hours by a dryer heated at 60° C. (manufactured by ESPEC CORP., product name: Perfect Oven SPHH-301) to form an aerogel particle-containing coating film on the aluminum foil.

The obtained coating film was cut with aluminum foil with an interval of 3 mm to obtain a measurement sample. As the measurement apparatus, a compact table-top tester "EZ Test" (manufactured by SHIMADZU CORPORATION, product name) was used. The measurement was performed in such a manner that the sample was fixed while the aluminum foil surface faced the upper side, the aluminum foil was gripped, and the sample was pulled at a rate of 50 mm/min. The measurement was terminated at the time point when the aluminum foil was peeled off from the coating film. The results are shown in Table 1.

<Evaluation of Condensation>

The paste 1 was applied to a side surface of a stainless steel container having a size of 100×100×100 mm by using a metallic spatula so that the thickness after drying became 1 mm, and the paste 1 was dried at 60° C. for 2 hours, thereby forming an aerogel particle-containing coating film on the container side surface. A caulking agent (manufactured by TAKADA CHEMICAL PRODUCTS MFG. CO., LTD., product name: SWANBOND 112) was applied to the cross-section of the coating film to protect the coating film so that moisture did not enter from the cross-section. Thereby, an evaluation sample was obtained.

Next, 900 mL of ice water at 0° C. was put in the container, and the container was input to a thermo-hygrostat set to a temperature of 20° C. and a humidity of 80% and left to stand still for 1 hour. After still standing, the container was taken out, and whether water droplets occur at each of the coating film surface and the interface between the coating film and the container was checked by visual inspection. A case where water droplets were not confirmed was evaluated as ○, and a case where water droplets were confirmed was evaluated as X. The results are shown in Table 1.

Example 2

5 parts by mass of hydroxypropylmethylcellulose (manufactured by Matsumoto Yushi-Seiyaku Co., Ltd., product name: MP-30000), 10 parts by mass of glass fibers (chopped strand, fiber diameter: 13 μm, fiber length: 3 mm), 100 parts by mass of the aerogel particles A, 300 parts by mass of a silicone resin (manufactured by Shin-Etsu Chemical Co., Ltd., product name: POLON-MF-56, solid content: 40 wt %), 20 parts by mass of isopropyl alcohol, and 500 parts by mass of water were mixed to obtain a paste 2. Thereafter, various evaluations were performed in the same manner as in Example 1.

Comparative Example 1

Pyrogel XT (manufactured by Aspen Aerogels, Inc.: thickness: 5 mm) was provided. Pyrogel is an insulating aerogel blanket obtained by immersing silica aerogel in glass fiber non-woven fabric. This product was used instead of the coating film, and evaluation of condensation was performed. Specifically, Pyrogel XT was cut into a size of 100×100 mm, and this cross-section was fixed to the container sider surface while being caulked, thereby obtaining an evaluation sample.

TABLE 1

| Item | Example 1 | Example 2 | Comparative Example 1 |
|---|---|---|---|
| Thermal conductivity (steady state method) [W/m · K] | 0.035 | 0.038 | — |

TABLE 1-continued

| Item | Example 1 | Example 2 | Comparative Example 1 |
|---|---|---|---|
| Peeling strength [kN/m] | 0.13 | 0.05 | — |
| Surface condensation | ○ | ○ | ○ |
| Interface condensation | ○ | ○ | X |

As shown in Table 1, the interface condensation that is an underlying cause of corrosion under insulation can be suppressed by the aerogel particle-containing coating film. On the other hand, in an insulation such as an aerogel blanket, since voids in the interface existed to no small extent, the interface condensation could not be suppressed.

The invention claimed is:

1. A method for suppressing the corrosion of a pipe under insulation, comprising a step of applying a paste comprising aerogel particles, a liquid medium, a binder resin, and a fibrous substance to a surface of the pipe to form a corrosion-resistant coating film thereon,
   wherein the binder resin comprises a first binder resin and a second binder resin having a lower solubility to the liquid medium than the first binder resin, and the first binder resin is a cellulose-based resin or an acrylic acid-based resin, and
   wherein the content of the fibrous substance is 5 parts by mass or more and 25 parts by mass or less, with respect to 100 parts by mass of the aerogel particles.

2. The method according to claim 1, wherein the content of the aerogel particles is 5% by mass or more based on the total amount of the paste.

3. The method according to claim 1, wherein the liquid medium is a water-based solvent containing water.

4. The method according to claim 1, wherein the content of the second binder resin is greater than the content of the first binder resin.

5. The method according to claim 1, wherein the aerogel particles have hydrophobicity.

6. The method according to claim 1, wherein the fiber diameter of the fibrous substance is 0.01 to 100 μm.

7. The method according to claim 1, wherein the second binder resin is a thermoplastic resin.

8. The method according to claim 7, wherein the second binder resin is an acrylic resin.

9. The method according to claim 1, wherein the second binder resin is a thermosetting resin.

10. The method according to claim 9, wherein the second binder resin is a silicone resin.

11. The method according to claim 1, wherein the content of the fibrous substance is 7 parts by mass or more and 20 parts by mass or less, with respect to 100 parts by mass of the aerogel particles.

12. The method according to claim 1, wherein the content of the fibrous substance is 9 parts by mass or more and 15 parts by mass or less, with respect to 100 parts by mass of the aerogel particles.

* * * * *